(12) United States Patent
Eloff et al.

(10) Patent No.: US 12,370,955 B2
(45) Date of Patent: Jul. 29, 2025

(54) MODULAR TRUCK SERVICE BODY

(71) Applicant: The Shyft Group, Inc., Charlotte, MI (US)

(72) Inventors: Johann Pieter Eloff, Fort Wayne, IN (US); Pushparaj Sanjeeva Ullal, Torrance, CA (US)

(73) Assignee: The Shyft Group, Inc., Charlotte, MI (US)

(*) Notice: Subject to any disclaimer, the term of this patent is extended or adjusted under 35 U.S.C. 154(b) by 379 days.

(21) Appl. No.: 18/060,105

(22) Filed: Nov. 30, 2022

(65) Prior Publication Data

US 2023/0219503 A1 Jul. 13, 2023

Related U.S. Application Data

(60) Provisional application No. 63/284,065, filed on Nov. 30, 2021.

(51) Int. Cl.
| | | |
|---|---|---|
| *B60R 9/02* | (2006.01) | |
| *B62D 21/03* | (2006.01) | |
| *B62D 27/06* | (2006.01) | |

(52) U.S. Cl.
CPC ............. *B60R 9/02* (2013.01); *B62D 21/03* (2013.01); *B62D 27/065* (2013.01)

(58) Field of Classification Search
CPC .......... B60R 9/02; B60R 11/06; B62D 21/03; B62D 27/065; B62D 33/0207; B60P 3/14
See application file for complete search history.

(56) References Cited

U.S. PATENT DOCUMENTS

| | | | | |
|---|---|---|---|---|
| 2,978,153 | A * | 4/1961 | Brindle | B60R 9/02 296/183.1 |
| 5,267,773 | A * | 12/1993 | Kalis, Jr. | B60R 11/06 296/183.1 |
| 5,421,645 | A * | 6/1995 | Young | B60R 11/06 296/37.6 |
| 6,105,231 | A * | 8/2000 | Clare | B60R 11/06 29/469 |
| 6,142,549 | A * | 11/2000 | Clare | B60R 11/06 296/183.1 |
| 11,186,235 | B2 * | 11/2021 | Klatt | B60R 9/065 |
| 11,305,823 | B2 * | 4/2022 | McKinney | B60R 13/01 |
| 2005/0134070 | A1 | 6/2005 | Plentis et al. | |
| 2007/0222247 | A1 * | 9/2007 | Jaeck | B60P 3/40 296/183.1 |
| 2016/0257351 | A1 * | 9/2016 | Boyer | B62D 29/043 |
| 2017/0113430 | A1 * | 4/2017 | Zimmer | B30B 9/3042 |
| 2020/0290524 | A1 | 9/2020 | Klatt et al. | |
| 2020/0339163 | A1 * | 10/2020 | Powidajko | B61D 7/30 |
| 2022/0289116 | A1 * | 9/2022 | Cleaves | B60R 9/02 |

OTHER PUBLICATIONS

International Search Report and Written Opinion; Issued Feb. 21, 2023 PCT/US2022/051370; Filed Nov. 30, 2022.

* cited by examiner

*Primary Examiner* — Lori Lyjak
(74) *Attorney, Agent, or Firm* — Barnes & Thornburg LLP (57) ABSTRACT

A modular service body for a vehicle includes a first side pack and a second side pack each including a plurality of storage compartments. The service body has a floor assembly between the first side pack and the second side pack. The first side pack and the second side pack are connected with the floor assembly in a weld-free manner such that there are a plurality of hidden connection points below a top surface of the floor assembly.

21 Claims, 9 Drawing Sheets

MODULAR TRUCK SERVICE BODY

RELATED APPLICATIONS

This application claims the benefit of U.S. Provisional Application No. 63/284,065 filed Nov. 30, 2021 for a "Module Truck Service Body", which is hereby incorporated by reference in its entirety.

TECHNICAL FIELD

This disclosure relates generally to truck service bodies; in particular, this relates to a modular service body.

BACKGROUND

Service body trucks can carry equipment, tools, parts, etc., needed for jobs, such as electrical, plumbing and general construction. Service bodies have storage compartments for tools and parts. Typically, service body trucks include a driver-side pack with one or more storage compartments and a passenger side pack with additional storage compartments separated by a floor assembly. A bulkhead portion is at the cab end of the floor assembly and a tailgate is located on the opposite end of the floor assembly to provide access to the truck's floor from the rear of the truck.

In some cases, the various components of the service body are welded together, which provides a rigid structure and torsional strength. Modular service bodies that are bolted together are also known, but these modular bodies typically do not provide the structural rigidity and strength provided by welded service bodies. Another drawback of existing modular service bodies is exposed bolts, which can be seen from the side and rear of the truck. These bolts are not only unsightly, but due to the traditionally inferior strength and rigidity of modular service bodies, the exposed bolts signal a service body with inferior characteristics compared to welded service bodies that do not have exposed bolts.

Figure 1:
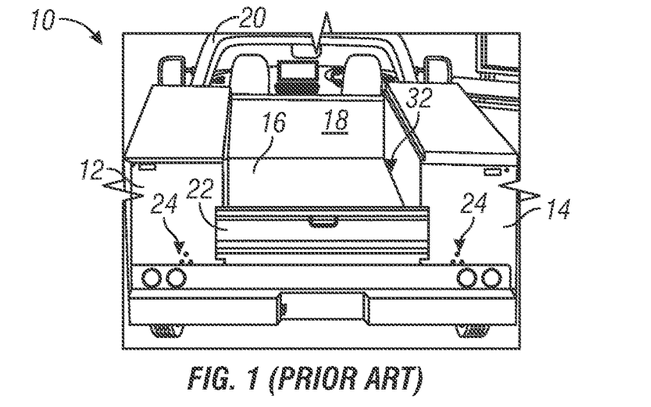
FIG. 1 is a rear perspective view of a prior art truck with a modular service body.

FIGS. 1-4 show various views of a prior art modular service body truck 10 which illustrates the exposed bolts that signal an inferior service body compared to one that is welded. FIG. 1 shows a rear view of the example service body truck 10 with a modular service body. As shown, the truck 10 includes a driver-side pack 12 and a passenger side pack 14 that are each connected on opposite sides of a floor assembly 16. The truck 10 includes a bulkhead 18 near the cab 20 that connects to each of the side packs 12, 14. Likewise, on the opposing end of the floor assembly 16, there is a tailgate 22 connected to the side packs 12, 14. As seen from the rear of the truck 10, there are multiple exposed bolts 24 from the connection between the side packs 12, 14 and the floor assembly 16. As discussed herein, these exposed bolts are unsightly and signal inferior quality.

Figure 2A:
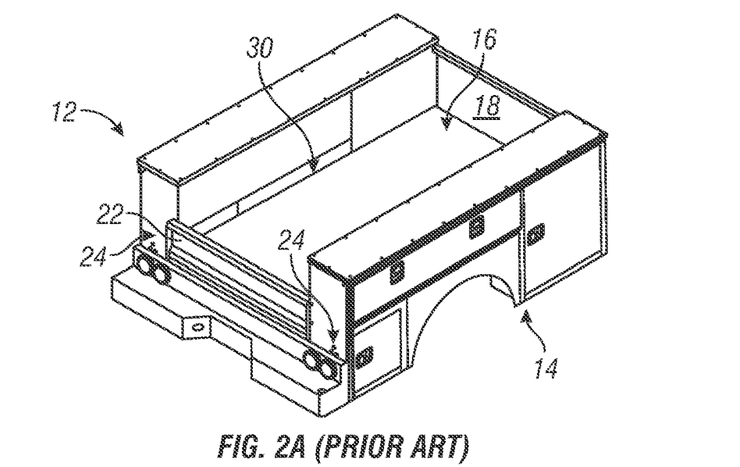
FIGS. 2A and 2B are passenger side perspective views of the prior art truck shown in FIG. 1 in a fully assembled state and with the passenger side pack unassembled, respectively.
Figure 2B:
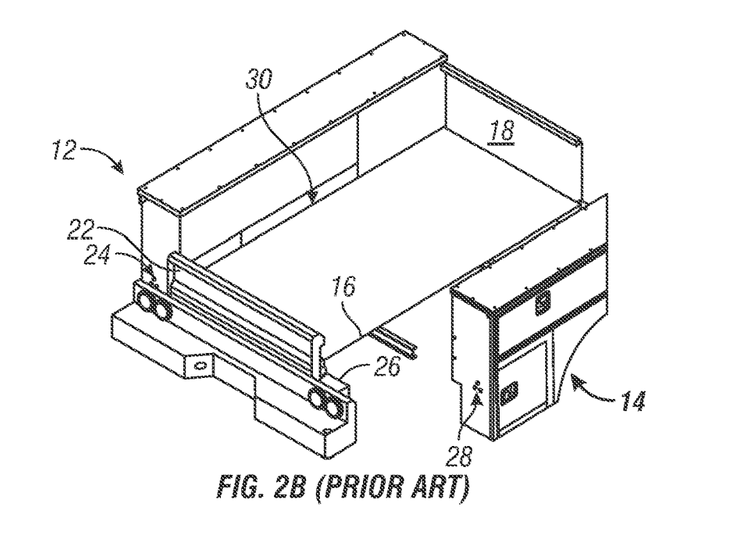

FIGS. 2A and 2B show the example service body with the side packs 12, 14 assembled and with the passenger side pack 14 removed, respectively. In FIG. 2B, a crossbeam 26 adjacent the tailgate 22 can be seen, which connects to the passenger side pack 14 and the rear wall of the passenger side pack 14 includes openings 28 through which the exposed bolts 24 connect to the crossbeam at that connection point.

Figure 3:
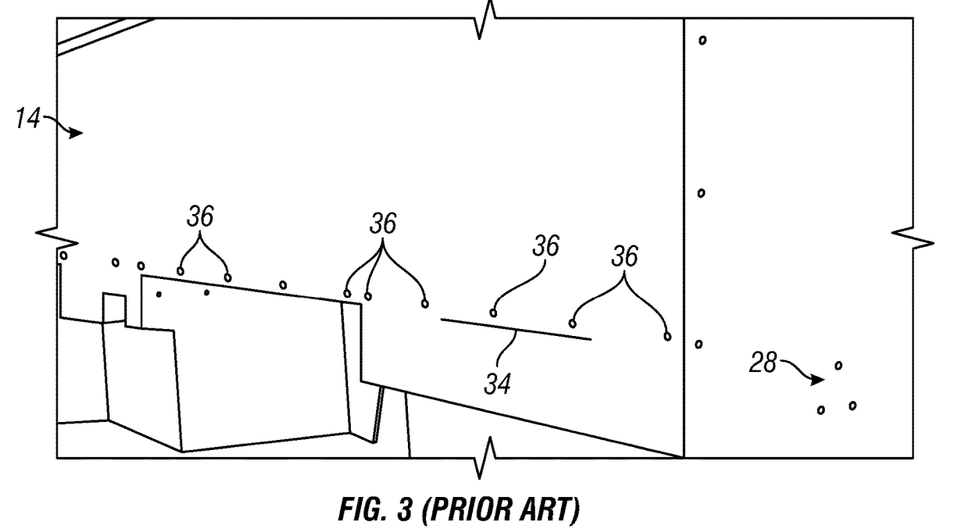
FIG. 3 is a detailed rear perspective view of the unassembled passenger side pack shown in FIG. 2B showing openings through which bolts extend to attach the passenger side pack to a lip of the floor assembly.
Figure 4:
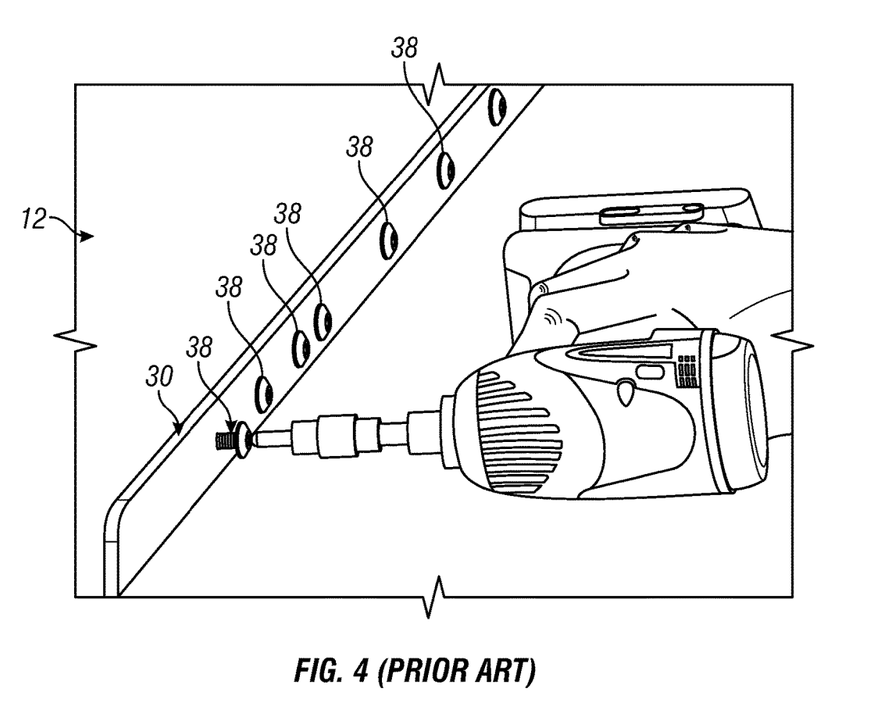
FIG. 4 is a detailed top perspective view of the prior art floor assembly with the driver-side lip being attached to the rear of the driver side pack with exposed bolts.
Figure 5:
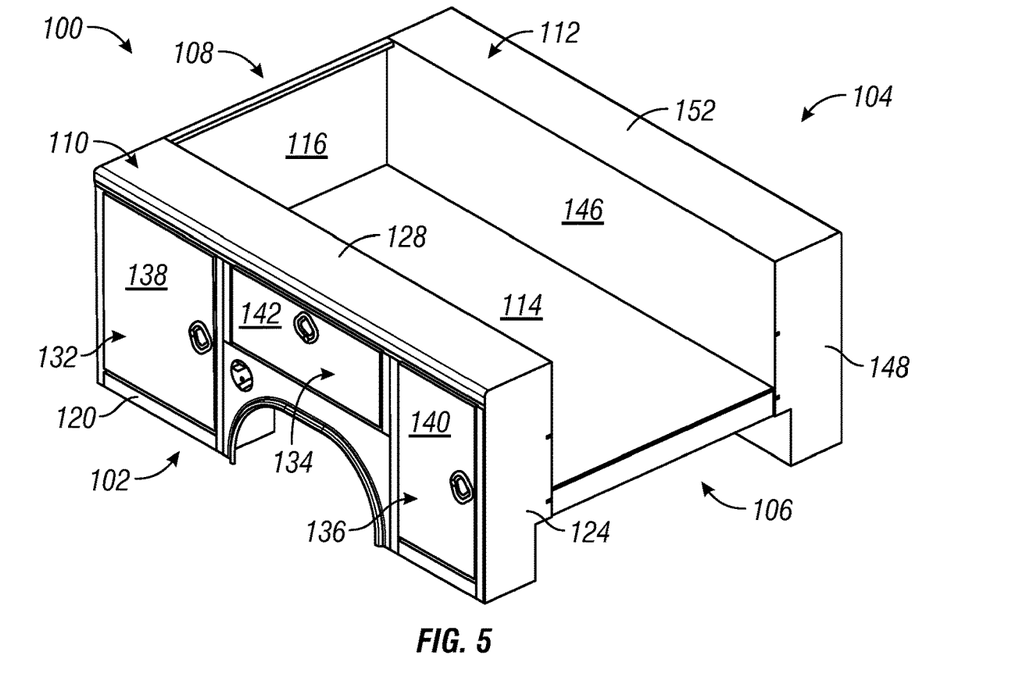
FIG. 5 is a driver-side perspective view from the tailgate end of an example service body for a truck according to an embodiment of this disclosure.
Figure 6:
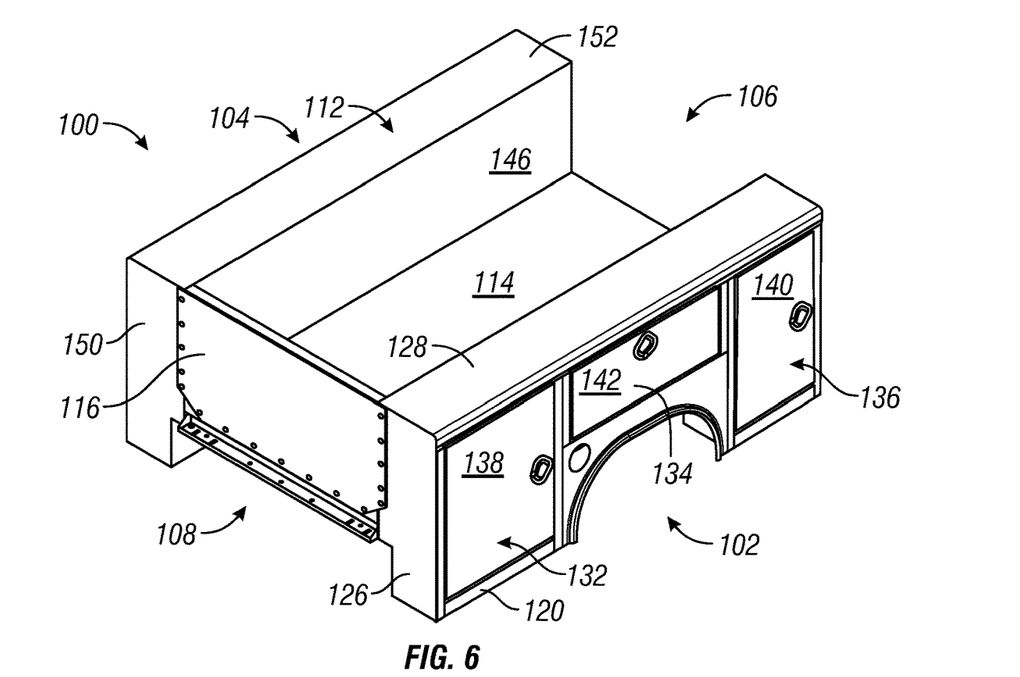
FIG. 6 is a driver-side perspective view from the bulkhead end of the example service body shown in FIG. 5.
Figure 7:
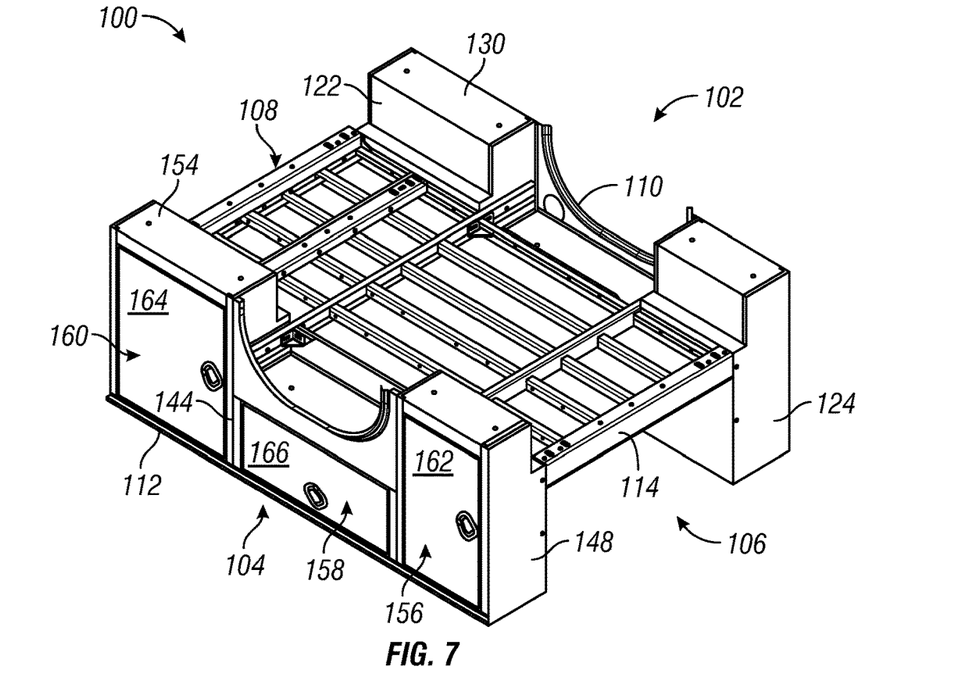
FIG. 7 is a bottom perspective view of the example service body shown in FIG. 5 from the tailgate end and passenger side.
Figure 8:
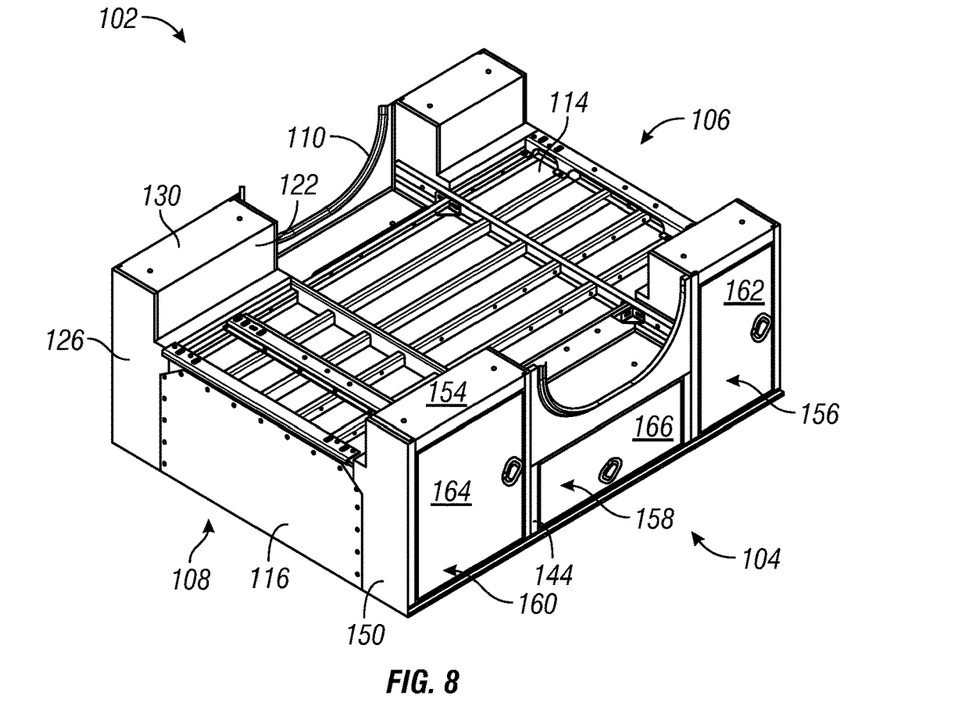
FIG. 8 is a bottom perspective view of the example service body shown in FIG. 5 from the bulkhead end and passenger side.
Figure 9:
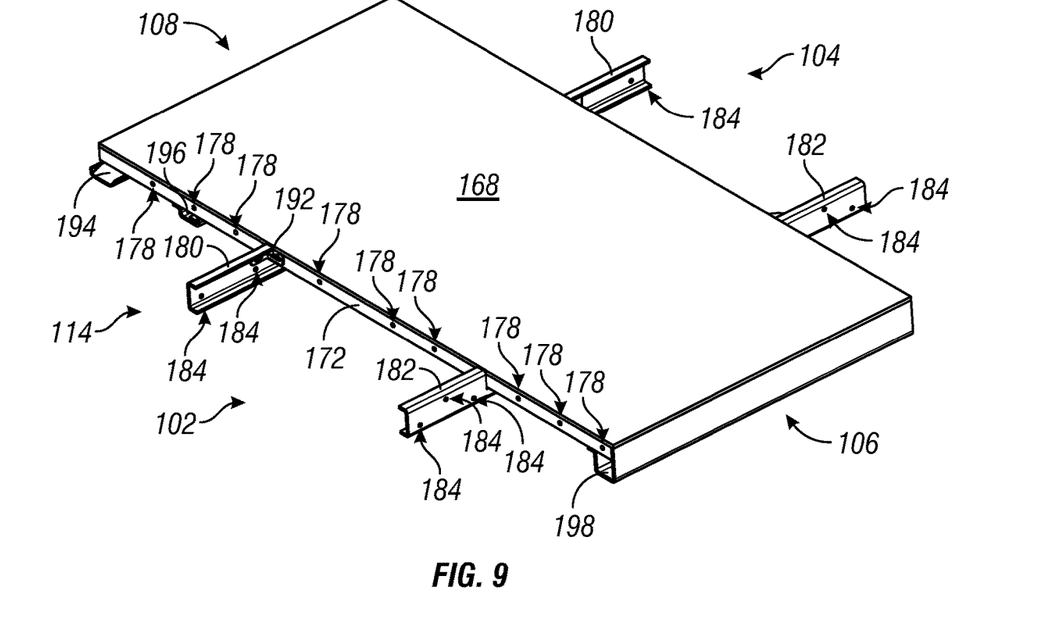
FIG. 9 is a driver-side perspective view of a floor assembly from the tailgate end according to an embodiment of this disclosure.
Figure 10:
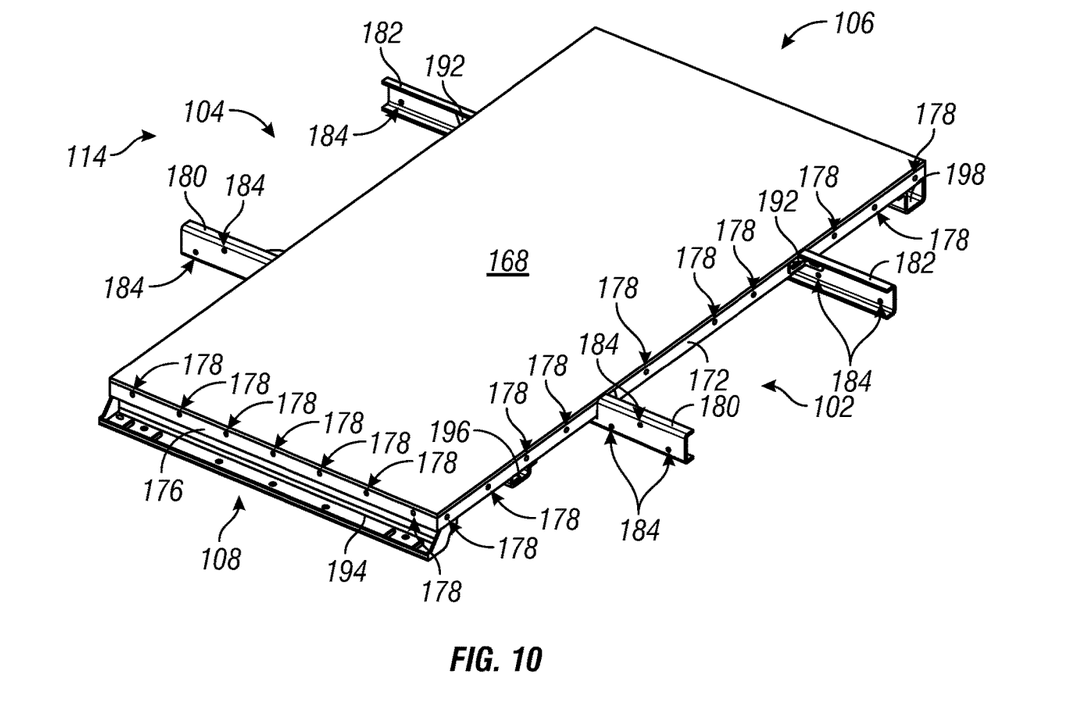
FIG. 10 is a driver-side perspective view of a floor assembly from the bulkhead end shown in FIG. 9.

In addition to the exposed bolts 24 visible from the rear of the truck 10, there are a plurality of exposed bolts 38 (FIG. 4) visible from the connection between the floor assembly 16 and the side packs 12, 14. The floor assembly 16 includes a driver-side lip 30 (FIG. 1) and a passenger-side lip 32 (FIG. 1) that each extend between the tailgate 22 and bulkhead 18. The lips 30, 32 extend upwardly above the floor surface onto which cargo and other items may be placed in the truck bed. The longitudinal axis of floor surface is illustrated by line 34 in FIG. 3. As can be seen in FIG. 3, the openings 36 in the side packs 12, 14 that receive the bolts 38 (FIG. 4) are positioned above the floor surface axis 34 so that they will be aligned with openings in the lips 30, 32, respectively, which also extend above the floor surface. This means that each of the bolts 38 that connect the lips 30, 32 to the side packs 12, 14 are exposed above the floor surface and can be seen from the rear and side of the truck 10, which is unsightly and signals an inferior service body compared to a welded service body.

Although modular service bodies may be generally acceptable for their purpose, there is a need for a modular service body that overcomes one or more of these obstacles.

SUMMARY

According to one aspect, this disclosure relates to a truck with a cab and a modular service body extending from the cab. The service body includes a first side pack and a second side pack each including a plurality of storage compartments. The service body has a floor assembly between the first side pack and the second side pack. The first side pack and the second side pack are connected with the floor assembly in a weld-free manner such that there are a plurality of hidden connection points below a top surface of the floor assembly.

According to another aspect, this disclosure relates to a modular service body for a vehicle. The service body includes a first side pack, a second side pack, and a floor assembly. The first side pack and the second side pack have a plurality of storage compartments. The floor assembly is between the first side pack and the second side pack. The first side pack and the second side pack are connected with the floor assembly in a weld-free manner such that there are a plurality of hidden connection points below a top surface of the floor assembly.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural features may be shown in specific arrangements. However, it should be appreciated that such specific arrangements may not be required. Rather, in some embodiments, such features may be arranged in a different manner than shown in the illustrative figures. Additionally, the inclusion of a structural in a particular figure is not meant to imply that such feature is required in all embodiments and, in some embodiments, may not be included or may be combined with other features.

This disclosure relates generally to a modular truck service body in which attachment connections between the floor assembly and side packs are hidden from the side and rear views of the truck. In some embodiments, the attachment connections are positioned in areas hidden from view to eliminate the unsightly exposed bolts seen in existing modular service bodies. This allows the service body, according to some embodiments, to appear more like a welded service body even though the service body is modular.

FIGS. 5-8 illustrate an example service body 100 that would be used with a vehicle, such as the truck shown in FIG. 1. As shown, the service body 100 includes a driver side 102, a passenger side 104, a tailgate end 106, and a bulkhead end 108. As shown, the driver side 102 includes a first side pack 110 that is spaced apart from a second side pack 112 on the passenger side 104. The side packs 110, 112 are spaced apart by and connected with a floor assembly 114. A bulkhead plate 116 extends between the side packs 110, 112. In some embodiments, the bulkhead plate 116 is connected to the side packs 110, 112 and the floor assembly 114. The floor assembly 114, side packs 110, 112 and bulkhead plate 116 are modular to be connected with each other in different shapes, sizes, and configurations, which provides flexibility in assembling the service body 100. Instead of welding together the side packs 110, 112 and bulkhead plate 116 to the floor assembly 114, in some embodiments these components are connected together with a plurality of fasteners 118 (FIG. 16); for example, in some embodiments, a fastener called a Huckbolt™ (two-part fasteners comprising pins and collars) from Howmet Fastening Systems & Rings, Inc. of Waco, Texas could be used.

The first side pack 110 has a front wall 120, a rear wall 122 (See, e.g., FIGS. 7-8), a tailgate end wall 124, a bulkhead end wall 126, a top wall 128, and a bottom wall 130. The walls 120, 122, 124, 126, 128, 130 of the first side pack 110 define a plurality of storage compartments. In the example shown, the plurality of storage compartments comprises a left storage compartment 132, a center storage compartment 134, and a right storage compartment 136. In some cases, the left and right storage compartments 132, 136 have a left door 138 and right door 140, respectively, that pivot outwardly about a vertical axis. Depending on the circumstances, the center storage compartment 134 with a center door 142 that may pivot about a horizontal axis. Of course, in some cases one or more of the left door 138 and right door 140 may pivot about a horizontal axis and the center door 142 could pivot about a vertical axis. Although three storage compartments 132, 134, 136 are shown for purposes of example, more or less storage compartments could be provided depending on the circumstances. Likewise, the relative positions of each storage compartment could have a different arrangement depending on the circumstances. As discussed herein, the side packs 110, 112 may come in different sizes, shapes, and configurations depending on the circumstances that may be interchangeably connectable with the floor assembly 114.

The second side pack 112 may be symmetrical with the first side pack 110 in some embodiments. As shown, the second side pack 112 has a front wall 144, a rear wall 146 (See, e.g., FIGS. 5-6), a tailgate end wall 148, a bulkhead end wall 150, a top wall 152, and a bottom wall 154. The walls 144, 146, 148, 150, 152, 154 of the second side pack 112 define a plurality of storage compartments. In the example shown, the plurality of storage compartments comprises a left storage compartment 156, a center storage compartment 158, and a right storage compartment 160. In some cases, the left and right storage compartments 156, 160 have a left door 162 and right door 164, respectively, that pivot outwardly about a vertical axis. Depending on the circumstances, the center storage compartment 158 with a center door 166 that may pivot about a horizontal axis. Of course, in some cases one or more of the left door 162 and right door 164 may pivot about a horizontal axis and the center door 166 could pivot about a vertical axis. Although three storage compartments 158, 160, 162 are shown for purposes of example, more or less storage compartments could be provided depending on the circumstances. Likewise, the relative positions of each storage compartment could have a different arrangement depending on the circumstances.

As can be seen, there are no connection points with exposed bolts attaching the rear walls 122, 146 of the side packs 110, 112 to the floor assembly 114 that can be from the side or rear of the service body 100 like the existing service body 10 with the exposed bolts 38 connecting the lip 30 to the side packs 12, 14. Instead of using a lip 30 that extends upwardly above the top surface of the floor assembly 16 with exposed bolts 38, the connection points between the floor assembly 114 and side packs 110, 112 are hidden below the top surface of the floor assembly 114 and the fasteners 118 are hidden inside the storage compartments 132, 134, 136, 156, 158, 160 behind the doors 138, 140, 142, 162, 164, 166 and behind the wheel well, which means there are no visible connection points with the doors closed.

Referring now to FIGS. 9-12, there is shown a floor assembly 114 according to an embodiment of the disclosure. As shown, there is a tread sheet 168 connected atop a structural arrangement 170. Depending on the circumstances, the tread sheet 168 may include surface ornamentation or be formed from a frictional material that provides grip. As shown, the driver side edge 172, passenger side edge 174, and bulkhead side edge 176 of the structural arrangement 170 include a plurality of openings 178 to receive fasteners 118. The openings 178 in the driver side edge 172 and passenger side edge 174 are spatially arranged to correspond with openings 179 in the rear wall 122 of the first side pack 110 and the rear wall 146 of the second side pack 112, respectively. The openings 178 in the bulkhead side edge 176 are spatially arranged to correspond with openings 181 in the bulkhead plate 116.

In the embodiment shown, the structural arrangement 170 includes a first cross member 180 spaced apart from a second cross member 182. The cross members 180, 182 each extend along an axis approximately perpendicular with a longitudinal axis of the tread sheet 168. As shown, the cross members 180, 182 include attachment portions that each extend beyond the driver side edge 172 and the passenger side edge 174 for attachment to a wall of the side packs 110, 112 within the wheel well portions. The example shown illustrates a plurality of openings 184 that receive fasteners 118 for connecting the cross members 180, 182 to the walls of the side packs 110, 112 within the wheel well. As shown, the fasteners 118 that connect the cross members 180, 182 to the side packs 110, 112 extend along an approximately perpendicular axis with respect to the fasteners 118 that connect the rear walls 122, 146 of the side packs 110, 112 to the side edges 172, 174. In the embodiment shown, each of these connection points to the structural arrangement 170 is below the plane of the tread sheet 168 so the fasteners 118 are hidden from view from the side and rear of the service body 100.

Figure 11:
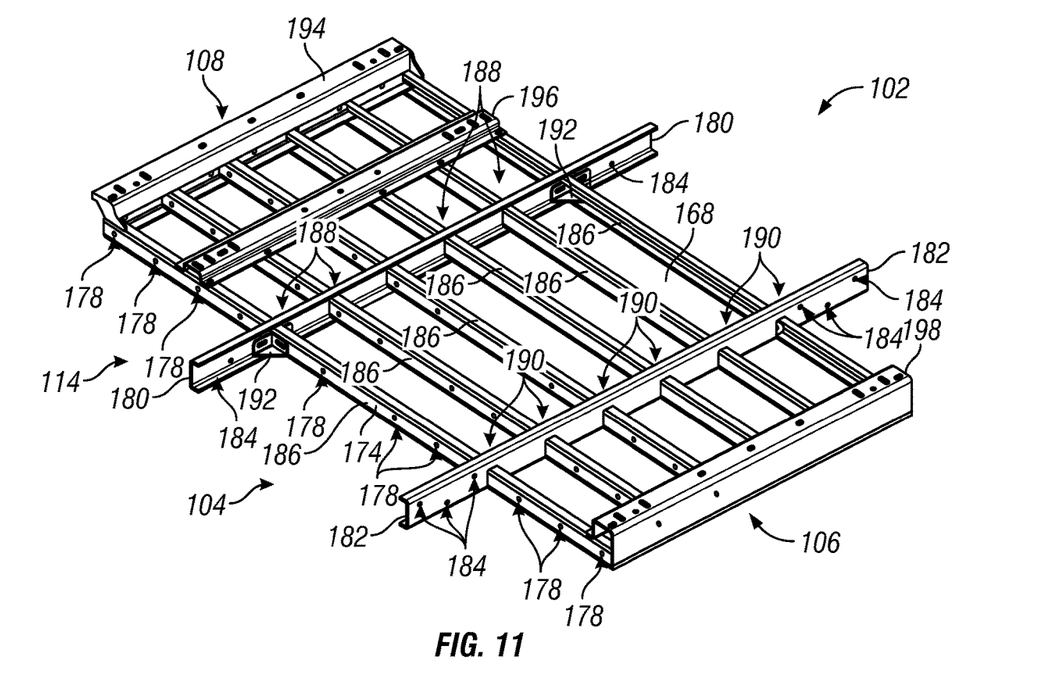
FIG. 11 is a bottom perspective view of the floor assembly shown in FIG. 9 from the tailgate end and passenger side.
Figure 12:
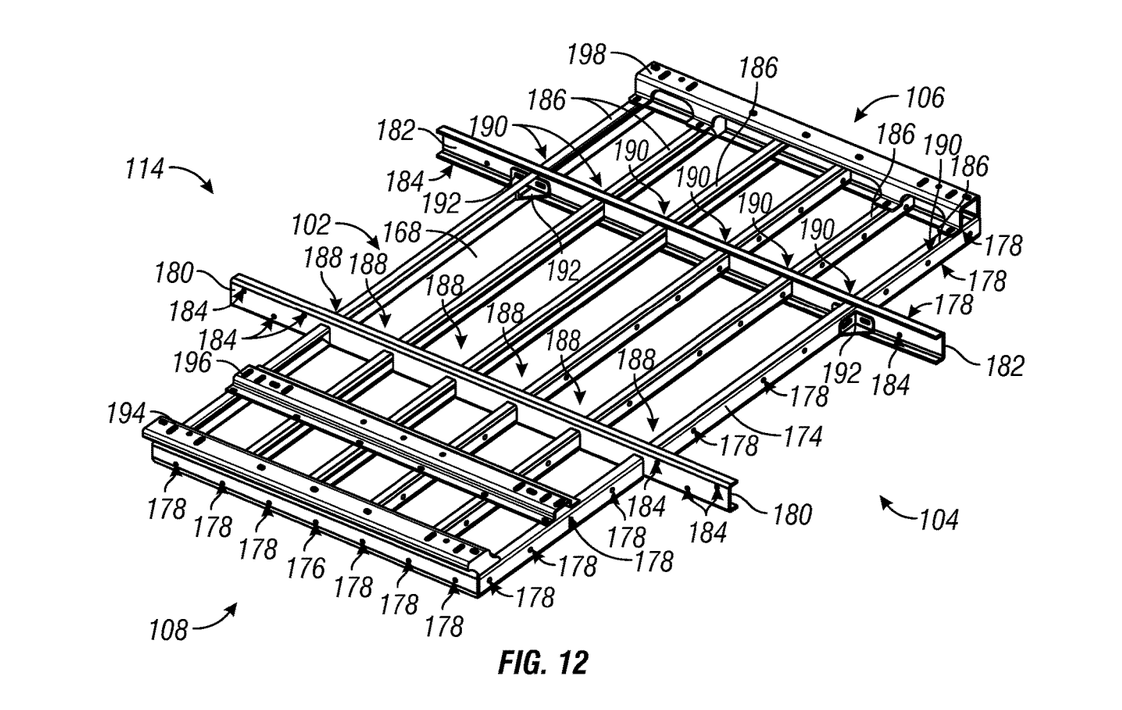
FIG. 12 is a bottom perspective view of the floor assembly shown in FIG. 9 from the bulkhead end and passenger side.

In the example shown in FIGS. 11 and 12, the structural arrangement 170 includes a plurality of structural beams 186 that extend along a longitudinal axis of the tread sheet 168, which is approximately perpendicular to the cross members 180, 182. Although this example shows six structural beams 186 for purposes of example, there could be more or less structural beams 186 depending on the structural requirements of the service body 100, other application requirements, etc. As shown, each of the structural beams 186 include a first cut-out portion 188 that is aligned to receive the first cross member 180 therethrough and a second cut-out portion 190 through which the second cross member 182 extends. In some embodiments, the cross members 180 have a C-shape with a portion that extends between the structural beams 186 and the tread sheet 168. In the example shown, there are structural brackets 192 reinforcing the outside structural beams 186 and the second cross member 182. However, other structural brackets 192 could be provided depending on the circumstances. In the example shown, there is a first structural reinforcement beam 194, a second structural reinforcement beam 196, and a third structural reinforcement beam 198 that extend approximately parallel to the cross members 180, 182.

Figure 13:
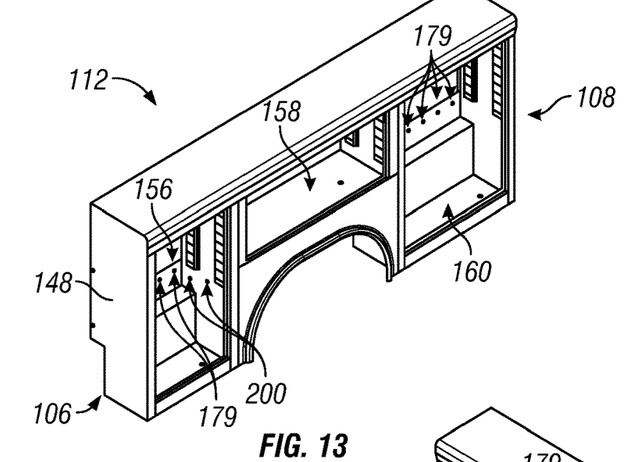
FIG. 13 is a front perspective view of an example passenger side pack from the tailgate side according to an embodiment of this disclosure.
Figure 14:
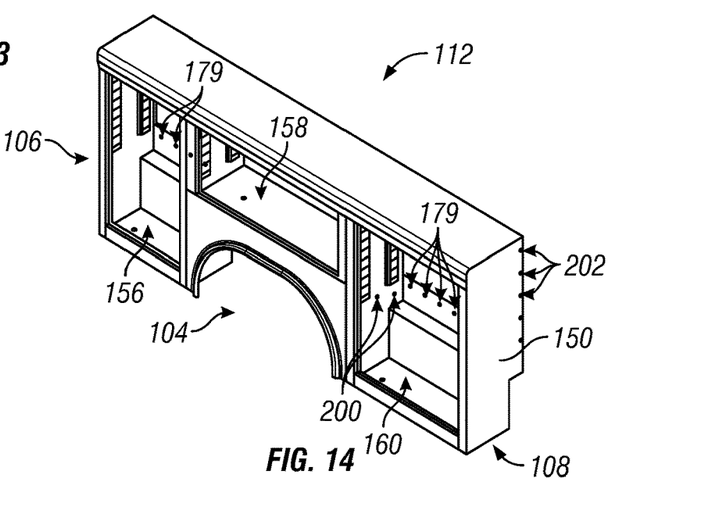
FIG. 14 is a front perspective view of the example passenger side pack shown in FIG. 13 from the bulkhead side.
Figure 15:
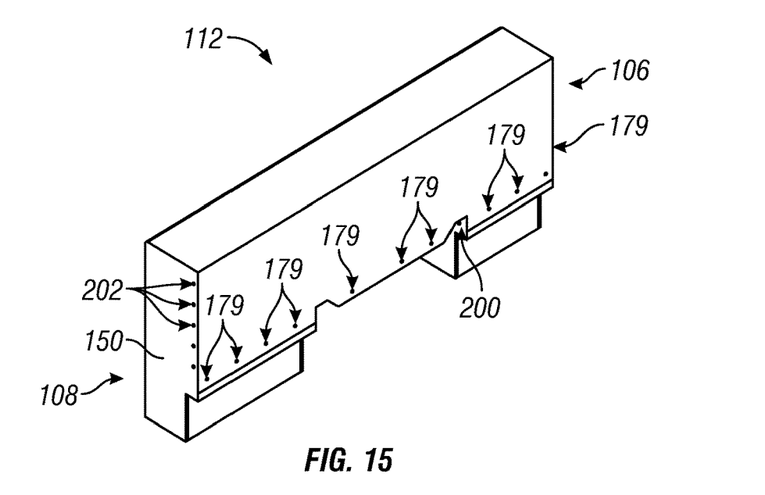
FIG. 15 is a rear perspective view of the example passenger side pack shown in FIG. 13 from the bulkhead side.

Referring now to FIGS. 13-15, there is shown an example second side pack 112 that would be connected to the passenger side 104 of the floor assembly 114 with the doors 162, 164, 166 removed. In some embodiments, the second side pack 112 may be symmetrical with respect to the first side pack 110, which would be connected to the driver side 102 of the floor assembly 114. As shown, the second side pack 112 includes a plurality of openings 179 in the rear wall 146 that are spatially arranged to correspond with the openings 178 in the passenger side edge 174 of the structural arrangement 170. The walls of the left and right storage compartments 132, 136 within the wheel well include openings 200 that are aligned with the openings 184 of the cross members 180, 182 (see FIG. 16). As shown, the bulkhead end wall 150 includes a plurality of openings 202 aligned with openings 181 of the bulkhead plate 146. As discussed herein, the size, shape, number of storage compartments, and configuration of the side packs 110, 112 could vary depending on the circumstances.

Figure 16:
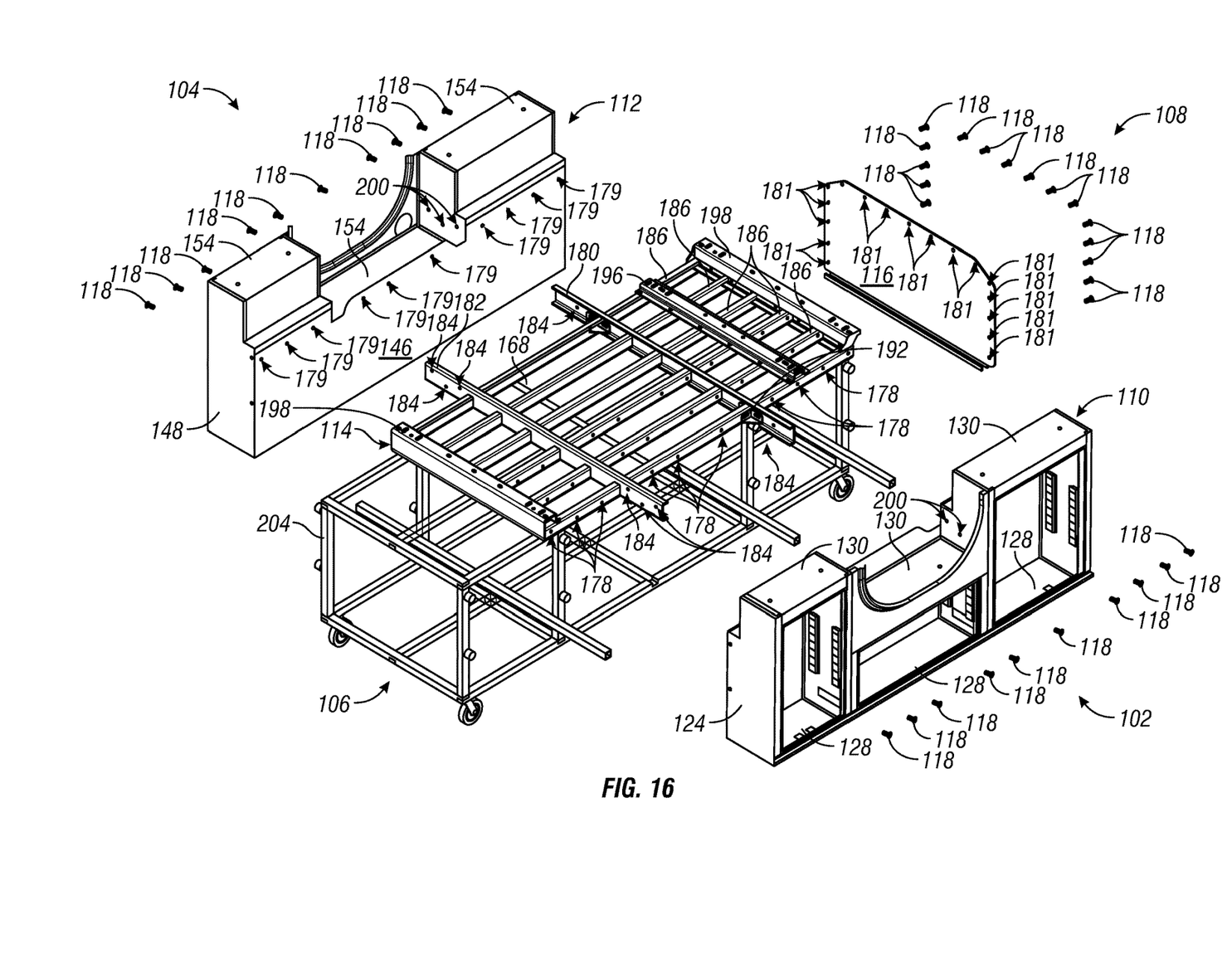
FIG. 16 is an bottom, exploded perspective view of the example service body shown in FIG. 5 with the floor assembly elevated on a work bench.

FIG. 16 shows an exploded view of the example service body 100 with the doors removed from the side packs 110, 112 and the floor assembly 114 supported by a work table 204. As discussed herein, the side packs 110, 112 are modular and can be attached/removed from the floor assembly 114 with fasteners 118. In the embodiment shown, the rear walls, 122, 146 of the side packs 110, 112 include openings 179 that are spatially arranged to correspond with openings 178 in side edges 172, 174 of the structural arrangement 170. As shown, the plane extending through the connection points between the rear walls 122, 146 of side packs 110, 112 and the side edges 172, 174 of the structural arrangement 170 is below the plane extending through the tread sheet 168, which hides the fasteners 118 from view below the tread sheet 168. Additionally, the fasteners 118 are hidden from view within the storage compartments 132, 134, 136, 156, 158, 160, which cannot be seen when the doors 138, 140, 142, 162, 164, 166 are on. In addition to the connection points between the rear walls 122, 146 of the structural arrangement 170 and the floor assembly 114, there are connection points between the side pack's 110, 112 side walls of storage compartments 132, 136, 156, and 160 within the wheel well and the cross members 180, 182 of the structural arrangement 170. As shown, the side walls 132, 136, 156, and 160 of storage compartments within the wheel well include openings 200 that are spatially arranged to correspond with openings 184 in the cross members 180, 182. When fasteners 118 extend through openings 200, 184 to connect the side packs 110, 112 with the cross members 180, 182, the fasteners 118 are hidden from view. In the embodiment shown, the bulkhead plate 116 is also connected to the structural framework 170 with fasteners 118.

Figure 17:
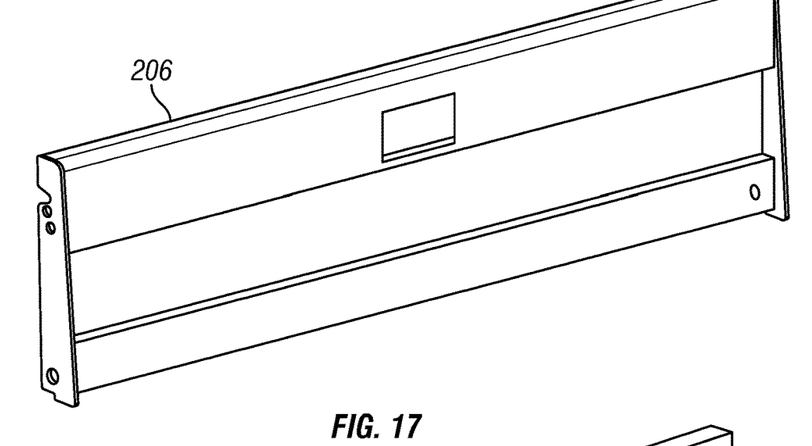
FIG. 17 is a rear, perspective view of an example tailgate that could be used with the service body according to an embodiment of the disclosure.

FIG. 17 illustrates an example tailgate 206 that could be connected to the service body 100. The tailgate 206 may have a pivotal connection to move between open and closed position to provide access to the floor of the service body 100.

Figure 18:
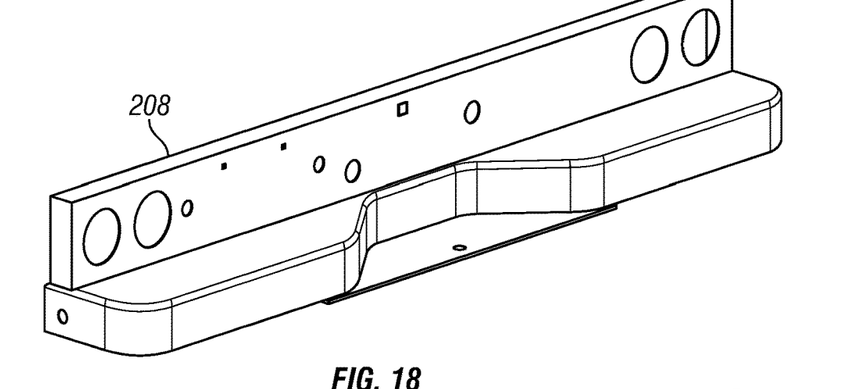
FIGS. 18 and 19 are rear and front perspective views, respectively, of an example bumper that could be used with the service body according to an embodiment of the disclosure.
Figure 19:
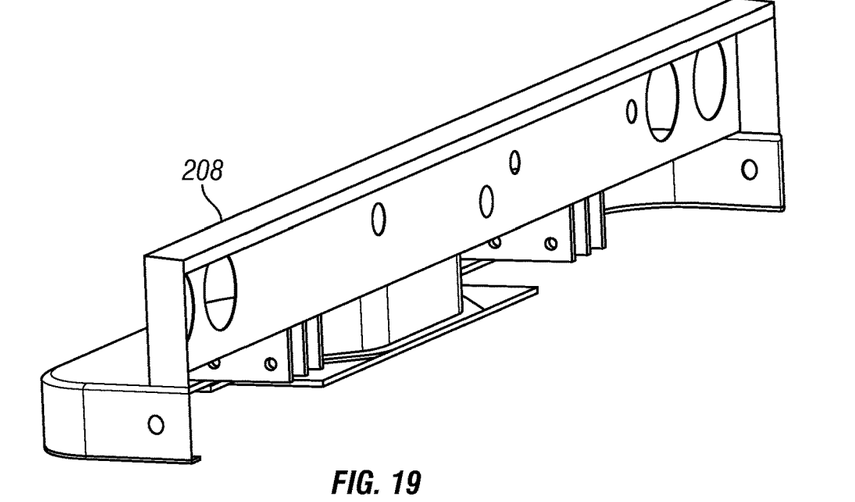

FIGS. 18 and 19 illustrate an example bumper 208 that could be connected to the service body 100. This could provide protection to the service body 100 in the event of an accident or collision with the rear portion of the service body. Depending on the circumstances, the bumper 208 could be attached to the structural arrangement 170 with fasteners.

EXAMPLES

Illustrative examples of the truck service body disclosed herein are provided below. An embodiment of the modular truck service body may include any one or more, and any combination of, the examples described below.

Example 1 is a truck with a cab and a service body extending from the cab. The service body includes a first side pack and a second side pack each including a plurality of storage compartments. The service body has a floor assembly between the first side pack and the second side pack. The first side pack and the second side pack are connected with the floor assembly in a weld-free manner such that there are a plurality of hidden connection points below a top surface of the floor assembly.

Example 2 includes the subject matter of Example 1, wherein: the floor assembly includes a first side edge connected with a rear wall of the first side pack, wherein the first side edge extends below the top surface of the floor assembly.

Example 3 includes the subject matter of Examples 1-2, wherein: the floor assembly includes a second side edge connected with a rear wall of the second side pack, wherein the second side edge extends below the top surface of the floor assembly.

Example 4 includes the subject matter of Examples 1-3, wherein: the rear wall of the first side pack includes a plurality of openings that are alignable with a plurality of openings in the first side edge to receive a plurality of fasteners therethrough to connect the first side pack and the floor assembly, wherein the plurality of openings in the rear wall of the first side pack extend below a plane defined by the top surface of the floor assembly when the first side pack is connected to the floor assembly.

Example 5 includes the subject matter of Examples 1-4, wherein: the rear wall of the second side pack includes a plurality of openings that are alignable with a plurality of openings in the second side edge to receive a plurality of fasteners therethrough to connect the second side pack and the floor assembly, wherein the plurality of openings in the rear wall of the second side pack extend below a plane defined by the top surface of the floor assembly when the second side pack is connected to the floor assembly.

Example 6 includes the subject matter of Examples 1-5, wherein: the floor assembly includes a tread sheet supported by a frame arrangement comprising a plurality of spaced-apart structural beams and at least one cross member extending approximately perpendicular with the plurality of spaced-part structural beams.

Example 7 includes the subject matter of Examples 1-6, wherein: the plurality of space-apart structural beams includes a first structural beam with an edge connected with the first side pack, wherein the edge of the first structural beam extends below a plane defined by the tread sheet.

Example 8 includes the subject matter of Examples 1-7, wherein: the plurality of space-apart structural beams includes a second structural beam with an edge connected with the second side pack, wherein the edge of the second structural beam extends below a plane defined by the tread sheet.

Example 9 includes the subject matter of Examples 1-8, wherein: the at least one cross member includes a first attachment portion extending transversely beyond the edge of the first structural beam.

Example 10 includes the subject matter of Examples 1-9, wherein: the at least one cross member includes a second attachment portion extending transversely beyond the edge of the second structural beam.

Example 11 includes the subject matter of Examples 1-10, wherein: the first attachment portion is connected to a side wall of the first side pack, wherein the first attachment portion and the side wall of the first side pack are connected with one or more fasteners within a wheel well portion of the first side pack.

Example 12 includes the subject matter of Examples 1-11, wherein: the second attachment portion is connected to a side wall of the second side pack, wherein the second attachment portion and the side wall of the second side pack are connected with one or more fasteners within a wheel well portion of the second side pack.

Example 13 includes the subject matter of Examples 1-12, wherein: the first side pack and the second side pack are connected with the floor assembly using one or more fasteners of the type called Huck™ bolts.

Example 14 is a service body for a vehicle. The service body includes a first side pack, a second side pack, and a floor assembly. The first side pack and the second side pack have a plurality of storage compartments. The floor assembly is between the first side pack and the second side pack. The first side pack and the second side pack are connected with the floor assembly in a weld-free manner such that there are a plurality of hidden connection points below a top surface of the floor assembly.

Example 15 includes the subject matter of Example 14, wherein: the floor assembly includes a first side edge connected with a rear wall of the first side pack, wherein the first side edge extends below the top surface of the floor assembly.

Example 16 includes the subject matter of Examples 14-15, wherein: the floor assembly includes a second side edge connected with a rear wall of the second side pack, wherein the second side edge extends below the top surface of the floor assembly.

Example 17 includes the subject matter of Examples 14-16, wherein: the rear wall of the first side pack includes a plurality of openings that are alignable with a plurality of openings in the first side edge to receive a plurality of fasteners therethrough to connect the first side pack and the floor assembly, wherein the plurality of openings in the rear wall of the first side pack extend below a plane defined by the top surface of the floor assembly when the first side pack is connected to the floor assembly.

Example 18 includes the subject matter of Examples 14-17, wherein: the rear wall of the second side pack includes a plurality of openings that are alignable with a plurality of openings in the second side edge to receive a plurality of fasteners therethrough to connect the second side pack and the floor assembly, wherein the plurality of openings in the rear wall of the second side pack extend below a plane defined by the top surface of the floor assembly when the second side pack is connected to the floor assembly.

Example 19 includes the subject matter of Examples 14-18, wherein: the floor assembly includes a tread sheet supported by a frame arrangement comprising a plurality of spaced-apart structural beams and at least one cross member extending approximately perpendicular with the plurality of spaced-part structural beams.

Example 20 includes the subject matter of Examples 14-19, wherein: the plurality of space-apart structural beams includes a first structural beam with an edge connected with the first side pack, wherein the edge of the first structural beam extends below a plane defined by the tread sheet.

Example 21 includes the subject matter of Examples 14-20, wherein: the plurality of space-apart structural beams includes a second structural beam with an edge connected with the second side pack, wherein the edge of the second structural beam extends below a plane defined by the tread sheet.

Example 22 includes the subject matter of Examples 14-21, wherein: the at least one cross member includes a first attachment portion extending transversely beyond the edge of the first structural beam.

Example 23 includes the subject matter of Examples 14-22, wherein: the at least one cross member includes a second attachment portion extending transversely beyond the edge of the second structural beam.

Example 24 includes the subject matter of Examples 14-23, wherein: the first attachment portion is connected to a side wall of the first side pack, wherein the first attachment portion and the side wall of the first side pack are connected with one or more fasteners within a wheel well portion of the first side pack.

Example 25 includes the subject matter of Examples 14-24, wherein: the second attachment portion is connected to a side wall of the second side pack, wherein the second attachment portion and the side wall of the second side pack are connected with one or more fasteners within a wheel well portion of the second side pack.

Example 26 includes the subject matter of Examples 14-25, wherein: the first side pack and the second side pack are connected with the floor assembly using one or more fasteners of the type called Huck™ bolts.

The invention claimed is:

1. A truck comprising:
a cab portion;
a service body extending from the cab portion, the service body comprising:
a first side pack comprising a plurality of storage compartments;
a second side pack comprising a plurality of storage compartments;
a floor assembly between the first side pack and the second side pack, wherein the first side pack and the second side pack are connected with the floor assembly in a weld-free manner such that there are a plurality of hidden connection points below a top surface of the floor assembly;
wherein the floor assembly includes a first side edge connected with a rear wall of the first side pack, wherein the first side edge extends below the top surface of the floor assembly;
wherein the floor assembly includes a second side edge connected with a rear wall of the second side pack, wherein the second side edge extends below the top surface of the floor assembly; and
wherein the rear wall of the first side pack includes a plurality of openings that are alignable with a plurality of openings in the first side edge to receive a plurality of fasteners therethrough to connect the first side pack and the floor assembly, wherein the plurality of openings in the rear wall of the first side pack extend below a plane defined by the top surface of the floor assembly when the first side pack is connected to the floor assembly.

2. The truck of claim 1, wherein the rear wall of the second side pack includes a plurality of openings that are alignable with a plurality of openings in the second side edge to receive a plurality of fasteners therethrough to connect the second side pack and the floor assembly, wherein the plurality of openings in the rear wall of the second side pack extend below a plane defined by the top surface of the floor assembly when the second side pack is connected to the floor assembly.

3. The truck of claim 1, wherein the floor assembly includes a tread sheet supported by a frame arrangement comprising a plurality of spaced-apart structural beams and at least one cross member extending approximately perpendicular with the plurality of spaced-part structural beams.

4. The truck of claim 3, wherein the plurality of space-apart structural beams includes a first structural beam with an edge connected with the first side pack, wherein the edge of the first structural beam extends below a plane defined by the tread sheet.

5. The truck of claim 4, wherein the plurality of space-apart structural beams includes a second structural beam with an edge connected with the second side pack, wherein the edge of the second structural beam extends below a plane defined by the tread sheet.

6. The truck of claim 5, wherein the at least one cross member includes a first attachment portion extending transversely beyond the edge of the first structural beam.

7. The truck of claim 6, wherein the at least one cross member includes a second attachment portion extending transversely beyond the edge of the second structural beam.

8. The truck of claim 7, wherein the first attachment portion is connected to a side wall of the first side pack, wherein the first attachment portion and the side wall of the first side pack are connected with one or more fasteners within a wheel well portion of the first side pack.

9. The truck of claim 8, wherein the second attachment portion is connected to a side wall of the second side pack, wherein the second attachment portion and the side wall of the second side pack are connected with one or more fasteners within a wheel well portion of the second side pack.

10. The truck of claim 1, wherein the first side pack and the second side pack are connected with the floor assembly using one or more two-part fasteners comprising pins and collars.

11. A service body for a vehicle, the service body comprising:
a first side pack comprising a plurality of storage compartments;

a second side pack comprising a plurality of storage compartments;

a floor assembly between the first side pack and the second side pack, wherein the first side pack and the second side pack are connected with the floor assembly in a weld-free manner such that there are a plurality of hidden connection points below a top surface of the floor assembly;

wherein the floor assembly includes a first side edge connected with a rear wall of the first side pack, wherein the first side edge extends below the top surface of the floor assembly wherein the floor assembly includes a second side edge connected with a rear wall of the second side pack, wherein the second side edge extends below the top surface of the floor assembly; and wherein the rear wall of the first side pack includes a plurality of openings that are alignable with a plurality of openings in the first side edge to receive a plurality of fasteners therethrough to connect the first side pack and the floor assembly, wherein the plurality of openings in the rear wall of the first side pack extend below a plane defined by the top surface of the floor assembly when the first side pack is connected to the floor assembly.

12. The service body of claim 11, wherein the rear wall of the second side pack includes a plurality of openings that are alignable with a plurality of openings in the second side edge to receive a plurality of fasteners therethrough to connect the second side pack and the floor assembly, wherein the plurality of openings in the rear wall of the second side pack extend below a plane defined by the top surface of the floor assembly when the second side pack is connected to the floor assembly.

13. The service body of claim 11, wherein the floor assembly includes a tread sheet supported by a frame arrangement comprising a plurality of spaced-apart structural beams and at least one cross member extending approximately perpendicular with the plurality of spaced-part structural beams.

14. The service body of claim 13, wherein the plurality of space-apart structural beams includes a first structural beam with an edge connected with the first side pack, wherein the edge of the first structural beam extends below a plane defined by the tread sheet.

15. The service body of claim 14, wherein the plurality of space-apart structural beams includes a second structural beam with an edge connected with the second side pack, wherein the edge of the second structural beam extends below a plane defined by the tread sheet.

16. The service body of claim 15, wherein the at least one cross member includes a first attachment portion extending transversely beyond the edge of the first structural beam.

17. The service body of claim 16, wherein the at least one cross member includes a second attachment portion extending transversely beyond the edge of the second structural beam.

18. The service body of claim 17, wherein the first attachment portion is connected to a side wall of the first side pack, wherein the first attachment portion and the side wall of the first side pack are connected with one or more fasteners within a wheel well portion of the first side pack.

19. The service body of claim 18, wherein the second attachment portion is connected to a side wall of the second side pack, wherein the second attachment portion and the side wall of the second side pack are connected with one or more fasteners within a wheel well portion of the second side pack.

20. The service body of claim 11, wherein the first side pack and the second side pack are connected with the floor assembly using one or more two-part fasteners comprising pins and collars.

21. A truck comprising:
a cab portion;
a service body extending from the cab portion, the service body comprising:
 a first side pack comprising a plurality of storage compartments;
 a second side pack comprising a plurality of storage compartments;
 a floor assembly between the first side pack and the second side pack, wherein the first side pack and the second side pack are connected with the floor assembly in a weld-free manner such that there are a plurality of hidden connection points below a top surface of the floor assembly;
wherein the floor assembly includes a tread sheet supported by a frame arrangement comprising a plurality of spaced-apart structural beams and at least one cross member extending approximately perpendicular with the plurality of spaced-part structural beams;
wherein the plurality of space-apart structural beams includes a first structural beam with an edge connected with the first side pack, wherein the edge of the first structural beam extends below a plane defined by the tread sheet;
wherein the plurality of space-apart structural beams includes a second structural beam with an edge connected with the second side pack, wherein the edge of the second structural beam extends below a plane defined by the tread sheet; and
wherein the at least one cross member includes a first attachment portion extending transversely beyond the edge of the first structural beam.

* * * * *